Patented Apr. 26, 1927.

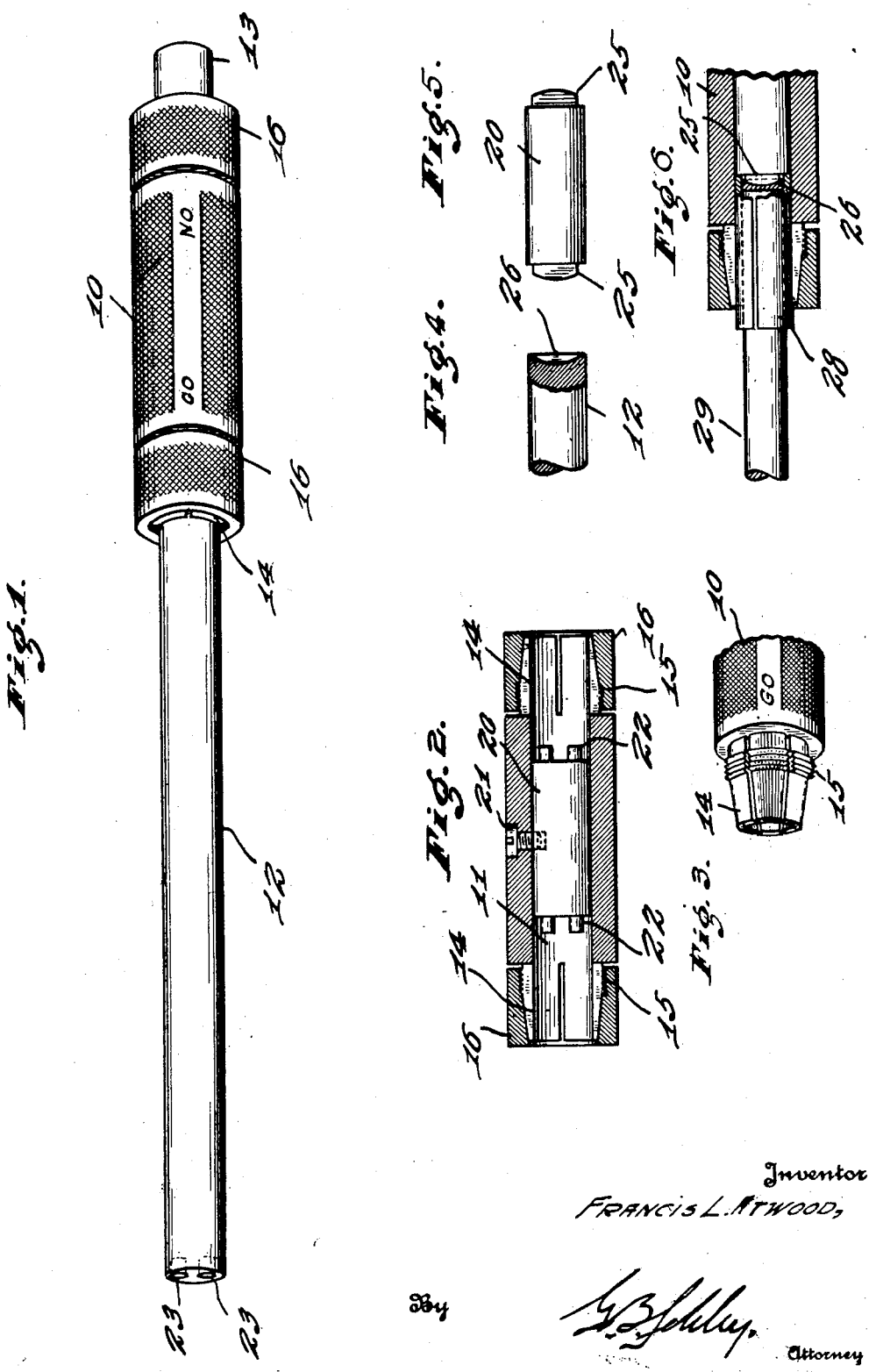

1,626,176

UNITED STATES PATENT OFFICE.

FRANCIS L. ATWOOD, OF ANDERSON, INDIANA.

PLUG GAUGE.

Application filed May 25, 1926. Serial No. 111,567.

It is the object of my invention to produce a plug gauge which may be accurately and economically manufactured, which has a separate gauging element which can be replaced when worn, and in which the gauging element will have a longer life than have the gauging elements of gauges heretofore made.

I accomplish the above object by employing a handle, preferably cylindrical, adapted to receive in its end gauging elements which differ slightly in size so that the whole structure will form a gauge of the "go" and "not-go" type, and I construct my gauge so that the gauging elements, and particularly the "go" element, will be reversible in the handle so that when one end of such gauging element is worn below its normal diameter the gauging element can be reversed in the handle, thus doubling the effective life of the gauge.

The accompanying drawing illustrates my invention: Fig. 1 is a perspective view of the assembled gauge showing the "go" and "not-go" gauge elements in place in the handle; Fig. 2 is a longitudinal section through the handle; Fig. 3 is a perspective view of one end of the handle with the clamping cap removed; Fig. 4 is a fragmental longitudinal section illustrating the end of a gauge element of a slightly modified form; Fig. 5 is a side elevation of a handle plug to be used in connection with gauge elements of the type shown in Fig. 4; and Fig. 6 is a fragmental longitudinal section illustrating how gauging elements of different diameters may be adapted to one handle.

My improved gauge comprises a handle 10 provided with an axial bore 11 in opposite ends of which may be received a "go" gauge element 12 and a "not-go" gauge element 13. The bore 11 of the handle 10 is of such a diameter as to fit snugly the gauge elements 12 and 13. Near its ends, the handle 10 is reduced in diameter to provide projecting collet portions 14, the exterior surface of each of which is tapered and provided with screw-threads 15. On each collet 14 there is mounted a clamping collar 16 having a conical bore complementary to the conical outer surface of the projecting portion 14 and also having screw threads adapted to engage the screw threads 15 of the collet. Each collet 14 is provided with a plurality of longitudinal slots in order that it may be contracted by the collar 16 to grip a gauge element within it. To assist in handling the gauge and also to facilitate rotation of the collars 16, the exterior surfaces of the handle 10 and of the collars 16 are preferably knurled.

Desirably some means is provided for positively preventing relative rotation of the handle and gauge elements. Centrally located within the bore 11 of the handle 10 is a plug 20 which is secured to the handle as by the screw 21. At each end the plug 20 is provided with a pair of axially projecting pins 22 adapted respectively to enter holes 23 in the adjacent ends of the gauging elements 10 to prevent relative rotation of the gauging elements and the handle. The holes 23 are provided in both ends of the gauging elements in order that each gauging element may be reversed in the handle.

In Figs. 4 and 5 is illustrated a modified means for preventing rotation of the gauge elements in the handle. In the construction illustrated in Figs. 4 and 5 the plug 20, instead of being provided with the projecting pins 22, is provided at each end with a tongue 25 adapted to enter a transverse slot 26 in the adjacent end of the gauge element.

Although I contemplate using handles in which the diameter of the bore is substantially the same as that of the gauge elements 12 and 13, any handle 10 may be used with a smaller gauge element by means of the split collar 28 illustrated in Fig. 6. The collar 28 has a normal exterior diameter equal to the diameter of the bore 11 in the handle 10 and an internal diameter equal to that of the gauge element 29 which it is desired to clamp in the handle. In this construction, the gauge element 29 is provided with the holes 23 for the reception of the pins 22 or with the transverse slot 26 for the reception of the tongue 25.

In the gauge which I have described a gauge element may be easily removed and replaced with another. In addition, when the outer end of either gauging element is worn, the gauging element may be reversed in the handle, thus in effect doubling the life of each gauge element.

Although I have described a gauge having two gauge elements one of which is a "go" element and the other a "not-go" element, it will be evident that my invention can be embodied in a gauge having a single gauge element.

I claim as my invention:—

1. A plug gauge, comprising a cylindrical gauge element, a handle having an axial hole in one end thereof for receiving either end of said gauge element, means for preventing rotation of said gauge element in said handle, and means acting at that end of said gauge element which is received in such hole for holding said gauge element in said handle.

2. A plug gauge, comprising a cylindrical gauge element, a handle therefor, means carried by said handle for exerting lateral pressure on said gauge element near an end thereof for holding said gauge element in place in said handle, both ends of said gauge element being substantially similar so that said handle may be applied to either end of said gauge element, and means for positively preventing rotation of said gauge element in said handle.

3. A plug gauge as set forth in claim 2 with the addition that the means for preventing rotation of the gauge element in the handle consists of a projection carried by the handle and adapted to enter a depression provided in the adjacent end face of said gauge element.

4. A plug gauge, comprising a cylindrical gauge element, a handle, said handle being provided with a collapsible collet adapted to receive either end of said gauge element, means for collapsing said collet to cause it to grip the end of said gauging element, and means for preventing rotation of said gauge element in said handle.

5. A plug gauge, comprising a cylindrical gauge element, a handle, said handle being provided with a collapsible collet adapted to receive either end of said gauge element, said collet having an internal diameter substantially equal to the diameter of said gauge element, and means for collapsing said collet to cause it to grip the end of said gauging element.

In witness whereof, I have hereunto set my hand at Anderson, Indiana, this 22nd day of May, A. D. one thousand nine hundred and twenty six.

FRANCIS L. ATWOOD.